(12) United States Patent
Rementilla et al.

(10) Patent No.: US 11,316,922 B2
(45) Date of Patent: Apr. 26, 2022

(54) DYNAMIC SELECTION OF STORAGE DEVICE FOR STORING MEDIA

(71) Applicant: ARRIS Enterprises LLC, Suwanee, GA (US)

(72) Inventors: Richard P. Rementilla, San Diego, CA (US); Christopher S. DelSordo, Souderton, PA (US); Albert F. Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 375 days.

(21) Appl. No.: 15/444,466

(22) Filed: Feb. 28, 2017

(65) Prior Publication Data

US 2018/0248948 A1 Aug. 30, 2018

(51) Int. Cl.
*H04N 5/76* (2006.01)
*H04N 21/231* (2011.01)
(Continued)

(52) U.S. Cl.
CPC ...... *H04L 67/1097* (2013.01); *H04L 43/0882* (2013.01); *H04N 21/2187* (2013.01); *H04N 21/2221* (2013.01); *H04N 21/23103* (2013.01); *H04N 21/234309* (2013.01); *H04N 21/234363* (2013.01); *H04N 21/2402* (2013.01);
(Continued)

(58) Field of Classification Search
CPC ............ H04L 43/0882; H04L 67/1097; H04N 21/2187; H04N 21/2221; H04N 21/23103; H04N 21/234309; H04N 21/234363; H04N 21/2402; H04N 21/25833; H04N 21/2747; H04N 21/4135; H04N 21/4147; H04N 21/4184; H04N 21/4334; H04N 21/43615; H04N 21/43622; H04N 21/440218;
(Continued)

(56) References Cited

U.S. PATENT DOCUMENTS 5,988,078 A * 11/1999 Levine ................... H04N 5/782
348/460
7,092,977 B2 * 8/2006 Leung ...................... G06F 16/13
(Continued)

OTHER PUBLICATIONS

PCT Search Report & Written Opinion, RE: Application No. PCT/US2018/016747, dated Apr. 16, 2018.
(Continued)

*Primary Examiner* — Kevin T Bates
*Assistant Examiner* — Golam Mahmud
(74) *Attorney, Agent, or Firm* — Buchanan, Ingersoll & Rooney PC

(57) ABSTRACT

Methods, systems, and computer readable media may be operable to facilitate the dynamic selection of a storage device for storing media. When a recording request is received, storage information associated with resources of one or more networks and one or more storage devices may be retrieved, and a network may be selected for recording and storing the requested media based upon an algorithm that considers the retrieved information. One or more specific storage devices located on the selected network may be selected for recording and storing the requested media. The selection of the one or more specific storage devices may be made based upon an algorithm that considers the available resources and capabilities of available storage devices.

17 Claims, 5 Drawing Sheets

(51) Int. Cl.
| | |
|---|---|
| *H04N 21/2747* | (2011.01) |
| *H04N 21/433* | (2011.01) |
| *H04N 21/4335* | (2011.01) |
| *H04L 12/66* | (2006.01) |
| *H04L 12/931* | (2013.01) |
| *H04L 67/1097* | (2022.01) |
| *H04L 43/0882* | (2022.01) |
| *H04N 21/2187* | (2011.01) |
| *H04N 21/418* | (2011.01) |
| *H04N 21/436* | (2011.01) |
| *H04N 21/4402* | (2011.01) |
| *H04N 21/442* | (2011.01) |
| *H04N 21/2343* | (2011.01) |
| *H04N 21/24* | (2011.01) |
| *H04N 21/4147* | (2011.01) |
| *H04N 21/222* | (2011.01) |
| *H04N 21/258* | (2011.01) |
| *H04N 21/41* | (2011.01) |

(52) U.S. Cl.
CPC ... *H04N 21/25833* (2013.01); *H04N 21/2747* (2013.01); *H04N 21/4135* (2013.01); *H04N 21/4147* (2013.01); *H04N 21/4184* (2013.01); *H04N 21/4334* (2013.01); *H04N 21/43615* (2013.01); *H04N 21/43622* (2013.01); *H04N 21/44209* (2013.01); *H04N 21/440218* (2013.01); *H04N 21/44227* (2013.01); *H04N 21/44245* (2013.01); *H04N 21/440263* (2013.01)

(58) Field of Classification Search
CPC ..... H04N 21/440263; H04N 21/44209; H04N 21/44227; H04N 21/44245
USPC ........................................................ 709/226
See application file for complete search history.

(56) References Cited

U.S. PATENT DOCUMENTS

| | | | | |
|---|---|---|---|---|
| 8,214,422 | B1 * | 7/2012 | Woodward, Jr. | H04N 21/25808 709/201 |
| 8,248,931 | B2 * | 8/2012 | Klein | H04L 67/2842 370/230 |
| 8,826,351 | B2 * | 9/2014 | Li | H04N 5/76 725/100 |
| 8,875,198 | B1 * | 10/2014 | Goodwin | H04L 67/1095 725/87 |
| 8,923,685 | B2 * | 12/2014 | Roberts | H04N 21/4335 386/296 |
| 9,113,191 | B2 * | 8/2015 | Woodward, Jr. | H04N 21/42684 |
| 9,332,046 | B2 * | 5/2016 | Chan | H04L 65/4084 |
| 9,519,728 | B2 * | 12/2016 | Rieger | H04N 21/25816 |
| 9,521,455 | B1 * | 12/2016 | Gupta | H04N 21/4334 |
| 9,608,717 | B1 * | 3/2017 | Mathews | H04L 45/22 |
| 9,648,128 | B2 * | 5/2017 | Guo | H04L 67/2842 |
| 9,940,043 | B2 * | 4/2018 | Kottomtharayil | G06F 16/951 |
| 9,955,212 | B2 * | 4/2018 | Howarter | H04N 21/4334 |
| 10,200,213 | B1 * | 2/2019 | Mathews | H04L 65/4084 |
| 2003/0206711 | A1 * | 11/2003 | Berkheimer | G11B 27/107 386/360 |
| 2005/0138663 | A1 | 6/2005 | Throckmorton et al. | |
| 2006/0070109 | A1 * | 3/2006 | Renkis | G08B 13/19682 725/105 |
| 2008/0141309 | A1 * | 6/2008 | Barsness | H04N 5/84 725/58 |
| 2009/0100478 | A1 * | 4/2009 | Craner | H04N 21/47214 725/87 |
| 2009/0257729 | A1 * | 10/2009 | Ahn | H04N 21/2747 386/239 |
| 2010/0067525 | A1 * | 3/2010 | Matsui | H04L 65/80 370/389 |
| 2010/0153445 | A1 * | 6/2010 | Bi | H04N 7/17318 707/770 |
| 2011/0083154 | A1 * | 4/2011 | Boersma | H04N 21/637 725/109 |
| 2011/0293251 | A1 | 12/2011 | Roberts et al. | |
| 2012/0275766 | A1 * | 11/2012 | Woodward, Jr. | H04N 21/482 386/248 |
| 2013/0222523 | A1 | 8/2013 | Shanmukhadas et al. | |
| 2014/0115640 | A1 * | 4/2014 | Walsh | H04N 21/266 725/93 |
| 2014/0269314 | A1 | 9/2014 | Ozer et al. | |
| 2015/0089558 | A1 * | 3/2015 | Shimizu | H04N 21/2662 725/96 |
| 2015/0256862 | A1 * | 9/2015 | Fragale | H04N 21/2353 725/54 |
| 2015/0324379 | A1 | 11/2015 | Danovitz et al. | |
| 2015/0350712 | A1 | 12/2015 | Sarosi et al. | |
| 2016/0094585 | A1 * | 3/2016 | Shahbazian | H04L 63/105 726/1 |
| 2016/0112739 | A1 | 4/2016 | Rothschild et al. | |
| 2016/0142485 | A1 * | 5/2016 | Mitkar | G06F 16/128 707/681 |
| 2016/0248832 | A1 * | 8/2016 | Yang | H04L 67/10 |
| 2016/0358633 | A1 | 12/2016 | Poral et al. | |
| 2017/0006314 | A1 * | 1/2017 | Danovitz | H04N 21/2747 |
| 2017/0094356 | A1 * | 3/2017 | Mathews | H04L 51/22 |
| 2017/0339451 | A1 * | 11/2017 | Yoshizawa | H04N 21/4854 |
| 2018/0124455 | A1 * | 5/2018 | Urbanek | H04N 21/472 |
| 2019/0260814 | A1 * | 8/2019 | Amini | G08B 3/10 |

OTHER PUBLICATIONS

Office Action dated Jan. 5, 2021, by the Canadian Intellectual Property Office in corresponding Canadian Patent Application No. 3,053,914. (3 pages).

Office Action (Communication pursuant to Article 94(3) EPC) dated Oct. 25, 2021, by the European Patent Office in corresponding European Patent Application No. 18 706 057.9-1209. (6 pages).

* cited by examiner

DYNAMIC SELECTION OF STORAGE DEVICE FOR STORING MEDIA

TECHNICAL FIELD

This disclosure relates to the dynamic selection of a storage device for storing media.

BACKGROUND

Media storage may be provided to a subscriber in the form of a digital video recorder (DVR) or a network DVR (nDVR). Network DVR (nDVR) is a network based solution that stores provider content in a central location as opposed to, or along with, using a set-top box (STB) with local storage (as in the case of DVR STB deployments). Various benefits are realized by using nDVR, including a cost reduction for deploying hardware. Using nDVR, multiple system operators (MSO) may deploy platforms without hard-drives, thereby reducing capital expenditure costs and improving operational reliability.

With nDVR widely deployed, MSOs may be able to avoid or reduce the cost of adding an internal HDD (hard disk drive) to STBs. Rather, network servers provide a repository for DVR content for the consumer. However, sole use of network servers for storing content does have drawbacks in that any time a consumer wants to playback DVR content from the nDVR server, the DVR content must be streamed from the network server to the home. This may create an increase in WAN (wide-area network) and LAN (local-area network) traffic as compared to playback of DVR content that is played back locally from a DVR STB that has an internal or an external drive (e.g., eSATA (embedded serial advanced technology attachment)). Moreover, copyright laws may require an MSO to store individual copies of content for each consumer, thereby increasing the cost of storing DVR content in the cloud for a large MSO population. Further, copyright laws may require that different security and associated access control be applied for each streaming session to the customer, thereby negating the ability to share bandwidth costs across different customers.

Generally, consumers have an increasing need for a centralized network storage device so that personal content such as photos, music, and videos may be served to a multitude of devices. A centralized storage mechanism may be used to store DVR content. Consumers may also have access to several forms of local storage that can be added to a home network and/or STB. For example, the consumer may purchase an external HDD and attach the HDD to a STB in a home. The consumer may also add network storage to a LAN, and or use other connected devices within the home such as tablets, mobile devices, and other client devices that include local storage. In these cases, the installation and use of local storage may eliminate a monthly cost that would otherwise be incurred for DVR HDD storage.

Therefore, a need exists for improved methods and systems to more efficiently balance the use of LAN and WAN bandwidth usage and storage capacity when recording and playing back DVR content.

BRIEF DESCRIPTION OF THE DRAWINGS

Like reference numbers and designations in the various drawings indicate like elements.

DETAILED DESCRIPTION

Figure 1:
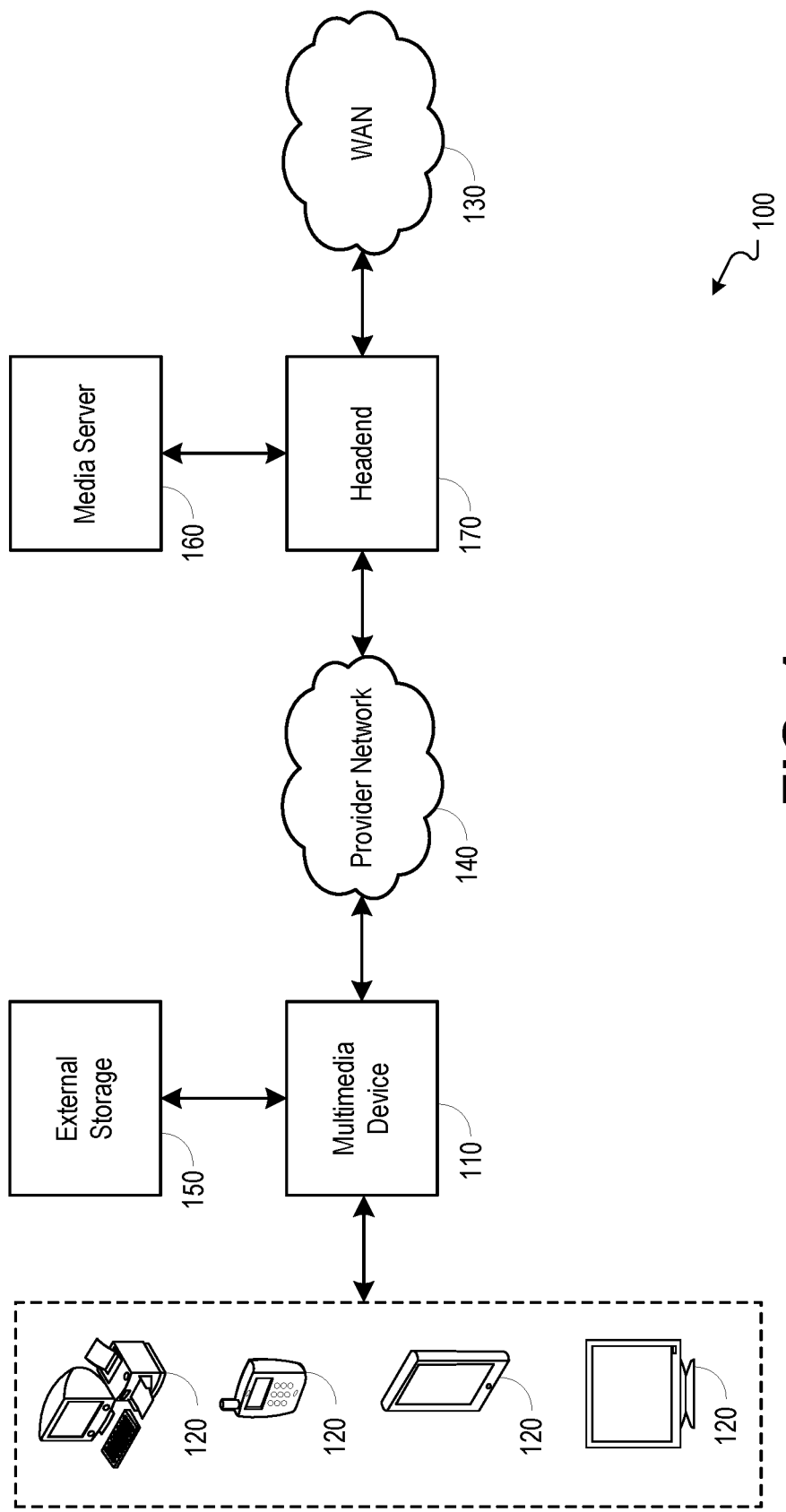
FIG. 1 is a block diagram illustrating an example network environment operable to facilitate the dynamic selection of a storage device for storing media.

It is desirable to provide methods and systems operable to dynamically select and distribute a recording amongst one or more storage devices. Methods, systems, and computer readable media may be operable to facilitate the dynamic selection of a storage device for storing media. When a recording request is received, storage information associated with resources of one or more networks and one or more storage devices may be retrieved, and a network may be selected for recording and storing the requested media based upon an algorithm that considers the retrieved information. One or more specific storage devices located on the selected network may be selected for recording and storing the requested media. The selection of the one or more specific storage devices may be made based upon an algorithm that considers the available resources and capabilities of available storage devices.

Disclosed herein is a system and method to discover, select and store video segments on storage devices based on previously and currently measured network bandwidth measurements, storage availability and transcoding availability. In embodiments, a single device may be used as the storage device for a recorded piece of content. In embodiments, several devices may be selected for distribution of the content for the length of a recording session. Various factors may be used to make the distribution choice. For example, current network bandwidth measurements may weigh more heavily in the decision as to where to record current media segments. Storage availability or network availability may influence the decision on where to distribute the content.

In embodiments, client software of a multimedia device may sense and gather pertinent information associated with storage and transcoding devices on a corresponding LAN (local area network) and WAN (wide area network). The multimedia device may dynamically detect the addition and/or removal of devices during runtime operation. The multimedia device may also dynamically keep track of the amount of space that is available for storage on the storage devices via interaction with the storage devices. The information associated with the available storage devices may be used as inputs to a decision making process used for deciding where to store a recording. For example, the multimedia device may select a best option for storing a piece of content based upon available network bandwidth and available storage space at one or more storage devices. The multimedia device may gather information associated with available bandwidth and usage of a LAN and/or WAN, and a media server (e.g., nDVR server) may retrieve information associated with storage availability and bandwidth usage at a WAN.

An embodiment of the invention described herein may include a method comprising: (a) receiving a request to create a recording of a piece of content; (b) retrieving storage information, the storage information comprising bandwidth usage of a wide-area network, bandwidth usage of a local-area network, storage availability of one or more wide-area network storage devices, and storage availability of one or more local-area network storage devices; (c) based upon the retrieved storage information, determining whether to store the recording of the piece of content within the wide-area network or the local-area network; (d) if the determination is made to store the recording of the piece of content within the wide-area network: (i) based upon the retrieved storage information, selecting one or more wide-area network storage devices for storing the recording of the piece of content; and (ii) storing the recording of the piece of content at the one or more selected wide-area network storage devices; and (e) if the determination is made to store the recording of the piece of content within the local-area network: (i) based upon the retrieved storage information, selecting one or more local-area network storage devices for storing the recording of the piece of content; and (ii) storing the recording of the piece of content at the one or more selected local-area network storage devices.

According to an embodiment of the invention, the storage information further comprises transcoding capabilities of one or more wide-area network storage devices and transcoding capabilities of one or more local-area network storage devices.

According to an embodiment of the invention, a plurality of local-area network storage devices are selected for storing the recording of the piece of content, and the recording of the piece of content is distributed amongst the plurality of local-area network storage devices such that a portion of the recording of the piece of content is stored at each local-area network storage device of the plurality of local-area network storage devices.

According to an embodiment of the invention, the bandwidth usage of the wide-area network and the bandwidth usage of the local-area network comprise qualitative assessments that are determined based upon a measurement of transmission rates for the wide-area network and the local-area network.

According to an embodiment of the invention, the one or more local-area network storage devices are identified from a list comprising each of one or more local-area network storage devices that are associated with the local-area network.

According to an embodiment of the invention, the one or more local-area network storage devices are identified and added to the list when the one or more local-area network storage devices are added to the local-area network.

According to an embodiment of the invention, the one or more local-area network storage devices are removed from the list when the one or more local-area network storage devices are removed from the local-area network.

An embodiment of the invention described herein may include an apparatus comprising: (a) an interface configured to be used to receive a request to create a recording of a piece of content; (b) one or more modules configured to: (i) retrieve storage information, the storage information comprising bandwidth usage of a wide-area network, bandwidth usage of a local-area network, storage availability of one or more wide-area network storage devices, and storage availability of one or more local-area network storage devices; (ii) based upon the retrieved storage information, determine whether to store the recording of the piece of content within the wide-area network or the local-area network; (iii) if the determination is made to store the recording of the piece of content within the wide-area network: (1) based upon the retrieved storage information, select one or more wide-area network storage devices for storing the recording of the piece of content; and (2) output the recording of the piece of content for storing at the one or more selected wide-area network storage devices; and (iv) if the determination is made to store the recording of the piece of content within the local-area network: (1) based upon the retrieved storage information, select one or more local-area network storage devices for storing the recording of the piece of content; and (2) output the recording of the piece of content for storing at the one or more selected local-area network storage devices.

An embodiment of the invention described herein may include one or more non-transitory computer readable media having instructions operable to cause one or more processors to perform the operations comprising: (a) receiving a request to create a recording of a piece of content; (b) retrieving storage information, the storage information comprising bandwidth usage of a wide-area network, bandwidth usage of a local-area network, storage availability of one or more wide-area network storage devices, and storage availability of one or more local-area network storage devices; (c) based upon the retrieved storage information, determining whether to store the recording of the piece of content within the wide-area network or the local-area network; (d) if the determination is made to store the recording of the piece of content within the wide-area network: (i) based upon the retrieved storage information, selecting one or more wide-area network storage devices for storing the recording of the piece of content; and (ii) storing the recording of the piece of content at the one or more selected wide-area network storage devices; and (e) if the determination is made to store the recording of the piece of content within the local-area network: (i) based upon the retrieved storage information, selecting one or more local-area network storage devices for storing the recording of the piece of content; and (ii) storing the recording of the piece of content at the one or more selected local-area network storage devices.

FIG. 1 is a block diagram illustrating an example network environment 100 operable to facilitate the dynamic selection of a storage device for storing media. In embodiments, a multimedia device 110 may be configured to provide multimedia services to one or more client devices 120. The multimedia device 110 may include a multimedia or residential gateway, a set-top box (STB), a digital video recorder (DVR) or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia device 110 to one or more client devices 120 over a local network (e.g., a local area network (LAN), a wireless local area network (WLAN), a personal area network (PAN), etc.). The multimedia device 110 may receive services from and may communicate with an upstream wide area network (WAN) 130 through a connection to a provider network 140. It should be understood that the multimedia device 110 may operate as an access point to wirelessly deliver multimedia content to one or more client devices 120 that are associated with the multimedia device 110 as stations.

In embodiments, a multimedia device 110 may communicate with a client device 120 over a wired or a wireless connection. The multimedia device 110 may provide one or more channels or service sets through which services and communications may be delivered wirelessly to one or more client devices 120. A client device 120 may associate and authenticate with a multimedia device 110 or associated access point (e.g., wireless router, network extender, etc.), after which communications and services may be delivered from the multimedia device 110 to the client device 120. It should be understood that various protocols and/or standards (e.g., Wi-Fi, multimedia over coax alliance (MoCA), Zig-Bee, Ethernet, etc.) may be used to deliver communications between a multimedia device 110 and client device 120. It should be further understood that a client device 120 may be physically connected to a multimedia device 110.

A multimedia device 110 may output live or linear content to a client device 120 as the content is received at the multimedia device 110, or the multimedia device 110 may store content and output the stored content to a client device 120 at a later time. For example, content may be transcoded and stored at the multimedia device 110, wherein the content is conditioned or transcoded into a format that is compatible with one or more client devices 120.

In embodiments, a multimedia device 110 may include storage for storing recorded pieces of content. The multimedia device 110 may receive a request from a user or from a client device 120 for the initiation of a recording of a piece of content. In response to the request, the multimedia device 110 may be configured to initiate the recording of the piece of content at the multimedia device 110 and the recording may be stored at storage of the multimedia device 110. In embodiments, the recording may be stored at one or more other storage devices. For example, the recording may be stored at an external storage 150 (e.g., external hard drive associated with the multimedia device 110), or the recording may be stored at an associated client device 120 (e.g., client device 120 having storage configured for storing a recording).

In embodiments, the requested recording may be made and stored at an upstream server. For example, the multimedia device 110 may notify a media server 160 of a request for a recording, and the media server 160 may create a recording for delivery to the multimedia device 110. The recording may be stored at the media server 160 until the recording is delivered to the multimedia device 110. The media server 160 may be a network digital video recorder (nDVR) server. Recording requests and downstream delivery of recordings may be managed by a headend 170.

In embodiments, when the media server 160 receives a request for a recording of a piece of content (e.g., a linear or live-off-disc (LOD) recording), the media server 160 may carry out a decision process for the selection of a storage device to be utilized for storing the recording. The decision process may include a determination whether to store the recording at a media server 160 or at a local storage device (e.g., a storage device within a subscriber premise such as the multimedia device 110, external storage 150, client device 120, etc.). The decision process may employ distributed storage mechanisms to select one or more storage locations for the recording. The decision process may utilize LAN (local area network) based input information that is provided from a multimedia device 110 and WAN (wide area network) based input information that is provided by the media server 160. It should be understood that the input information may include various different parameters associated with various storage devices and delivery mechanisms. In embodiments, the decision process may result in the determination to store one or more segments of an individual recording at multiple, different storage devices. For example, video segments may be distributed across more than one storage device for a single DVR recording. The multimedia device 110 and the media server 160 may communicate with each other to pass information associated with available network bandwidth and storage device capacity and capabilities to negotiate a storage location for a requested recording.

The media server 160 may use the decision process described herein each time a linear recording is initiated. The media server 160 may use the decision process described herein when a live off disk (LOD) recording is used for live television viewing. In embodiments, the client device 120 used by a viewer to access media content may provide the viewer with the LOD capability to enable various trickplay operations (e.g., pause, rewind, fast-forward, etc.) to be carried out on the content during playback of the content.

In embodiments, a viewer may make a request to record content via a direct interaction with the multimedia device 110, or recording requests may be made from client devices 120 (e.g., tablets, mobile devices, etc.). The multimedia device 110 may be configured to receive recording requests from a client device 120 that is connected to a mobile network (e.g., 4G, LTE, etc.). Recording requests made by a client device 120 may be routed to the multimedia device 110, where a determination may be made as to the optimum storage location for the recorded content among one or more available storage devices. A recording requested from a client device 120 may require a specific formatting of the content for optimal rendering of the content at the client device 120. Depending on the format requirement of the client device 120, the recording may need to be transcoded, and the multimedia device 110 may consider one or more transcoding devices when determining an optimal storage location for the recording.

The input information utilized by the decision process may include storage availability at various storage devices located at a LAN or WAN. For example, the media server 160 may eliminate one or more storage devices from consideration for storing the requested recording when the one or more storage devices are full or are otherwise lacking a sufficient amount of available storage for storing the requested recording.

The input information utilized by the decision process may include DVR bandwidth availability on a LAN or WAN. For example, one or more storage devices may be eliminated from consideration for storing the requested recording when the network or communication mechanism used for delivering content to the storage devices is lacking sufficient bandwidth to efficiently deliver the requested recording to the storage devices. LAN and WAN bandwidth measurement characteristics may be provided to the media server 160 as input information. Bandwidth may be measured on the relevant LAN and WAN during DVR media transmission. It should be understood that bandwidth may be measured at other instances such as during runtime. For example, bandwidth measurements may include runtime operational measurements that may provide information such as expected latency and overall network bandwidth. Other activities may also be considered during a bandwidth measurement including, but not limited to file transfers, code downloads, content synchronizations or copying, WLAN use by mobile devices, and others.

The input information utilized by the decision process may include requested or potential media format conversions of the recording. The input information may include an indication of the availability of a transcoder on the relevant LAN(s) and WAN(s) or specific storage devices on the LAN(s) and WAN(s). In embodiments, DVR content may be played back from a media server 160 to a client device 120 (e.g., tablet, mobile device, etc.), and the various client devices 120 connected to a multimedia device 110 may be connected to the multimedia device 110 through various connection mechanisms, protocols, and standards. For example, the various client devices 120 may require different, specific video formats for a best or preferred viewing of content (e.g., DVR recordings may be received in MPEG 2 format and may need to be transcoded to MPEG 4 format prior to viewing on a client device 120). When a transcoding of requested content is required, the multimedia device 110 may select content from available local storage and make use of a transcoder during the playback process to minimize bandwidth requirement usage at the corresponding LAN.

The input information utilized by the decision process may include a list of storage devices available for storing the requested recording. For example, the storage devices available may include storage devices on the relevant LAN(s) and WAN(s). The list of storage devices may be dynamically monitored and updated to reflect the addition and or removal of storage devices from the relevant LAN(s) and WAN(s). The storage devices that may be detected and used as input information for the decision process may be located on a LAN in the subscriber premise or on the WAN in a service provider's (multiple-system operator (MSO)) network. The storage devices may include internal and/or external (e.g., eSATA (embedded serial advanced technology attachment) HDD (hard disk drive)) associated with the multimedia device 110, SD (secure digital) cards that are connected to the multimedia device 110, NAS (network-attached storage) devices located on the LAN, computers or other client devices 120 that might have available storage, and/or the media server 160 (e.g., nDVR server storage).

The decision process may allow the media server 160 to dynamically optimize bandwidth usage for scenarios where a consumer dynamically adds additional media storage to a premise (e.g., via eSATA/NAS storage devices). The media server 160 may recognize the addition of these devices and, using the decision process described herein, the media server 160 may dynamically select a LAN-based device as the preferred storage location for a recording, thereby lowering future nDVR bandwidth usage. In response to the storage of the recording at a LAN-based device, a service provider (MSO) may lighten the burden of DVR bandwidth usage in high demand situations. It should be understood that the decision process, and/or certain applicable aspects of the decision process, may be run at various devices, including, but not limited to, the media server 160, devices operating within an associated WAN or LAN that are capable of providing input to the media server 160, and other devices.

The media server 160 may sense the insertion and/or disconnection of storage devices during runtime operation, and the media server 160 may maintain a list of available storage devices as optional DVR storage. During runtime operation, the media server 160 may sense and maintain information on the amount of storage for DVR content that is available at the storage devices connected to the LAN and WAN networks.

In embodiments, bandwidth usage may be collected by the multimedia device 110 and/or the media server 160. Transmissions of actual media content may be measured as the content is being played back or recorded during runtime operation, and the measurement may be made without the introduction of any unnecessary data/media transmissions. For example, historic information may be monitored and stored for each LAN or WAN usage, and the historic information may be used in future record destination considerations. The multimedia device 110 and/or the media server 160 may compute and use the average bandwidth usage over time to make storage decisions that prioritize the maintaining of a healthy network usage level. It should be understood that various techniques may be utilized to measure network bandwidth. For example, a packet/timing/return measurement (e.g., round-trip time (RTT) or other TCP (transmission control protocol) parameters may be monitored and measured to provide feedback indicating the state of network bandwidth usage/availability), network probing technique (e.g., data upload and measurement of probe parameters), or other technique may be used to measure bandwidth usage. The multimedia device 110 and/or media server 160 may maintain a central repository of LAN bandwidth availability and usage, and the central repository may be continuously updated.

In embodiments, the multimedia device 110 and the media server 160 may take measurements of a DVR content transmission rate. These rates may be compared to expected transmission rates that would be achieved under optimal network bandwidth loading. Each time a DVR recording or DVR playback session is initiated during runtime operation for a particular DVR storage device on either the LAN or WAN networks, transmission rate measurements may be made and information may be gathered and stored in memory. The transmission rate information may be processed periodically, and qualitative assessments of the network bandwidth for the particular storage device on a specific network for that period of time may be maintained. These qualitative assessments may be stored as historical data and may be used as inputs to the decision making algorithm controlling the selection of one or more storage devices for storing a recording. As an example, qualitative bandwidth assessments may include a highest level of network bandwidth availability (e.g., the available network bandwidth is able to support a significant increase in DVR content transmission before a degradation of performance is realized), a sufficient level of network bandwidth availability (e.g., the available network bandwidth is able to support an increase in DVR content transmission before a degradation of performance is realized), an insufficient level of network bandwidth availability (e.g., the available network bandwidth is not able to support an increase in DVR content transmission without a degradation of performance being realized), and a lowest or degraded level of network bandwidth availability (e.g., the network bandwidth availability is such that a degradation of performance already exists).

A selection of a storage device for storing a recording may be based upon the qualitative bandwidth assessments of the available storage devices. For example, the one or more storage devices selected for storing a recording may be those one or more storage devices having the highest or best qualitative bandwidth assessments relative to one or more other available storage devices. It should be understood that the LAN and WAN may make their own individual bandwidth assessments.

Bandwidth usage may vary from one device to the next with respect to DVR recording and/or DVR playback sessions. The specific bandwidth usage requirements may be maintained for each available storage device. For example, stored bandwidth usage information for local storage accessible by the multimedia device 110 over a LAN (e.g., internal and external HDDs and devices connected to or associated with the multimedia device 110) may include an indication that DVR recording and DVR playback by the local storage does not require additional LAN bandwidth. As another example, stored bandwidth usage information for a NAS device connected to the multimedia device 110 via a LAN may include an indication that DVR recording and DVR playback by the NAS device require LAN bandwidth for DVR content transmission. As yet another example, stored bandwidth usage information for the media server 160 may include an indication that DVR recording by the media server 160 may or may not require WAN bandwidth for DVR content transmission and that DVR playback by the media server 160 does require both WAN and LAN bandwidth for DVR content transmission.

Figure 2:
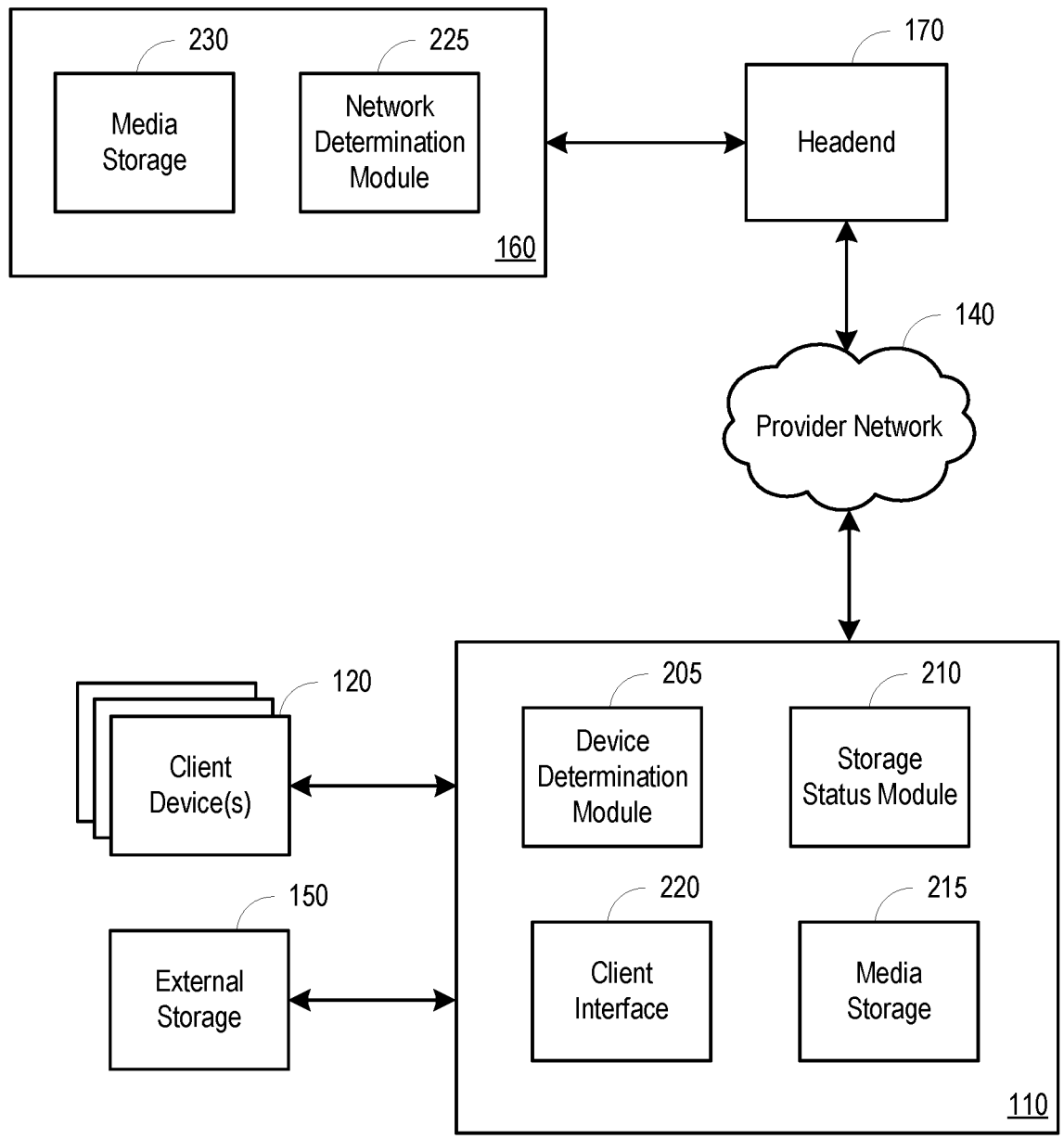
FIG. 2 is a block diagram illustrating an example multimedia device and media server operable to facilitate the dynamic selection of a storage device for storing media.

FIG. 2 is a block diagram illustrating an example multimedia device 110 and media server 160 operable to facilitate the dynamic selection of a storage device for storing media. The multimedia device 110 may include a device determination module 205, a storage status module 210, media storage 215, and a client interface 220. The multimedia device 110 may be a multimedia or residential gateway, a set-top box (STB), or any other device configured to receive, store, and/or deliver multimedia content to one or more client devices 120. The media server 160 may include a network determination module 225 and media storage 230.

In embodiments, the multimedia device 110 may communicate with one or more client devices 120 over a wired or a wireless connection through a client interface 220. The multimedia device 110 may output content and/or other services to client devices 120 through the client interface 220 and may receive requests for content and/or other upstream communications through the client interface 220. It should be understood that the client interface 220 may include various wired and/or wireless interfaces using various protocols and/or standards (e.g., Wi-Fi, multimedia over coax alliance (MoCA), ZigBee, Ethernet, etc.) to deliver communications between a multimedia device 110 and client device(s) 120. For example, the multimedia device 110 may communicate with one or more client devices 120 over a local network (e.g., LAN).

In embodiments, content may be received at the multimedia device 110 from an upstream network (e.g., provider network 140, WAN 130 of FIG. 1, etc.). Communications and services received at the multimedia device 110 may be forwarded to one or more client devices 120 through the client interface 215. For example, content streams (e.g., live or linear content, VoD content, recorded content, etc.) may be forwarded to one or more client devices 120 through the client interface 215.

In embodiments, a multimedia device 110 may include media storage 215 for storing recorded pieces of content. The multimedia device 110 may receive a request from a user or from a client device 120 (e.g., through the client interface 220) for the initiation of a recording of a piece of content. In response to the request, the multimedia device 110 may be configured to initiate the recording of the piece of content at the multimedia device 110 and the recording may be stored at the media storage 215. In embodiments, the recording may be stored at one or more other storage devices. For example, the recording may be stored at an external storage 150 (e.g., external hard drive associated with the multimedia device 110), or the recording may be stored at an associated client device 120 (e.g., client device 120 having storage configured for storing a recording).

In embodiments, the requested recording may be made and stored at an upstream server. For example, the multimedia device 110 may notify a media server 160 of a request for a recording, and the media server 160 may create a recording for delivery to the multimedia device 110. The recording may be stored at the media server 160 until the recording is delivered to the multimedia device 110. The media server 160 may be a network digital video recorder (nDVR) server. Recording requests and downstream delivery of recordings may be managed by a headend 170.

In embodiments, when the media server 160 receives a request for a recording of a piece of content (e.g., a linear or live-off-disc (LOD) recording), the network determination module 225 may carry out a decision process for the selection of a network and/or device to be utilized for storing the recording. The decision process may include a determination whether to store the recording at a WAN storage device such as the media server 160 (e.g., media storage 230) or at a LAN storage device such as a local storage device (e.g., a storage device within a subscriber premise such as the multimedia device 110, external storage 150, client device 120, etc.). The decision process may utilize LAN (local area network) based input information that is provided from a multimedia device 110 and WAN (wide area network) based input information that is provided by the media server 160. It should be understood that the input information may include various different parameters associated with various storage devices and delivery mechanisms. The multimedia device 110 and the media server 160 may communicate with each other to pass information associated with available network bandwidth and storage device capacity and capabilities to negotiate a storage location for a requested recording.

In embodiments, the network determination module 225 may retrieve input information to be used in a determination of a network at which a recording is to be stored. The input information may include storage availability at various storage devices located at a LAN or WAN, DVR bandwidth availability on a LAN or WAN, requested or potential media format conversions of the recording, a list of storage devices available for storing the requested recording (e.g., storage devices on corresponding LAN(s) and/or WAN(s)), and/or other information associated with recording and/or storing media at the corresponding WAN and/or LAN.

The network determination module 225 may sense the insertion and/or disconnection of storage devices during runtime operation, and the network determination module 225 may maintain a list of available storage devices as optional DVR storage. During runtime operation, the network determination module 225 may sense and maintain information on the amount of storage for DVR content that is available at the storage devices connected to the LAN and WAN networks. The storage devices that may be detected and used as input information for the decision process may be located on a LAN in the subscriber premise or on the WAN in a service provider's (multiple-system operator (MSO)) network. The storage devices may include internal and/or external storage (e.g., eSATA HDD associated with the multimedia device 110, SD cards that are connected to the multimedia device 110, NAS devices located on the LAN, computers or other client devices 120 that might have available storage), and/or the media server 160 (e.g., nDVR server storage).

In embodiments, bandwidth usage over a corresponding WAN and/or LAN may be collected by the network determination module 225. It should be understood that various techniques may be utilized to measure network bandwidth. For example, a packet/timing/return measurement (e.g., round-trip time (RTT) or other TCP (transmission control protocol) parameters may be monitored and measured to provide feedback indicating the state of network bandwidth usage/availability), network probing technique (e.g., data upload and measurement of probe parameters), or other technique may be used to measure bandwidth usage.

In embodiments, the network determination module 225 may take measurements of DVR content transmission rates, and may process the transmission rate information to periodically make qualitative assessments of the network bandwidth for storage devices on the corresponding WAN(s) and/or LAN(s). The qualitative assessments may be used as inputs to the decision making algorithm controlling the selection of a network and/or devices for storing a recording.

In embodiments, when the determination is made that a recording is to be stored at a LAN-side device, the device determination module 205 may select a LAN-side device for storing the recording. Storage devices available for storing a recording may include storage internal to the multimedia device 110 (e.g., media storage 215), external storage connected to the multimedia device 110 (e.g., external storage 150), client devices associated with the multimedia device 110 (e.g., client devices 120), or other storage device associated with a corresponding LAN. The device determination module 205 may select a LAN-side storage device based upon various parameters associated with each of the available storage devices. For example, information associated with the capacity and capabilities of the available storage devices may be retrieved and stored at the storage status module 210, and the information may include an amount of available storage, bandwidth available for delivering the content to the storage device, transcoding capability of the storage device, and other information. It should be understood that the storage status module 210 may report or publish the information associated with the capacity and capabilities of the available storage devices to a central repository (e.g., media server 160 or other device). A device for carrying out a recording function may be selected based upon storage availability, LAN/WAN bandwidth measurements, format conversion needs, and/or others.

The device determination module 205 may notify a selected LAN-side storage device of the decision to store a recording at the LAN-side storage device, and the recording may be stored at the LAN-side storage device.

Figure 3:
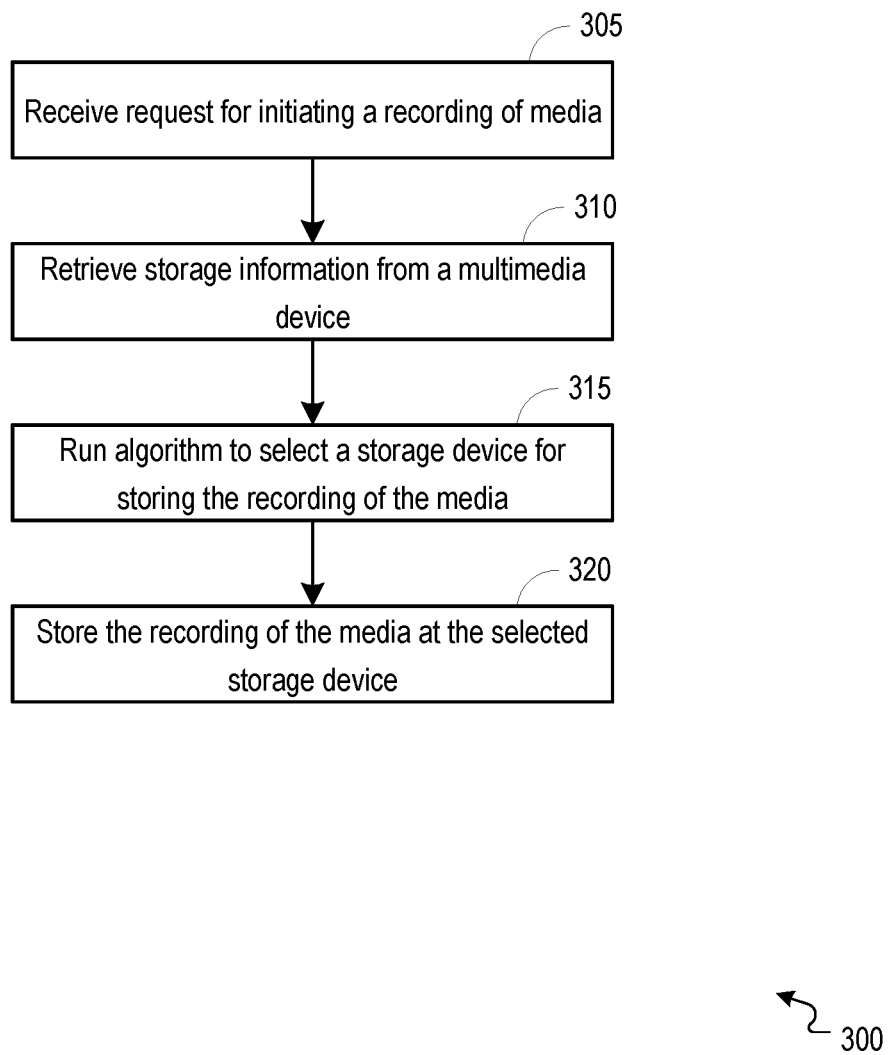
FIG. 3 is a flowchart illustrating an example process operable to facilitate a determination of a storage device for storing a recording of requested media.

FIG. 3 is a flowchart illustrating an example process 300 operable to facilitate a determination of a storage device for storing a recording of requested media. The process 300 can begin at 305, when a request for initiating a recording of media is received. The request for initiating the recording of the media may be received from a user at a multimedia device 110 of FIG. 1. The request may be received at the multimedia device 110 via a direct interaction between the user and the multimedia device 110, or the request may be received at the multimedia device 110 from another device (e.g., client device 120 of FIG. 1). In embodiments, the request for initiating the recording of the media may be communicated from the multimedia device 110 to a media server (e.g., media server 160 of FIG. 1).

At 310, storage information may be retrieved from a multimedia device. Storage information may be retrieved, for example, by a media server 160 of FIG. 1 (e.g., by a network determination module 225 of FIG. 2). The storage information may be collected and maintained at a multimedia device 110 of FIG. 1 (e.g., by a storage status module 210 of FIG. 2). The storage information may include LAN-based input information that is provided from a multimedia device 110 and/or WAN-based input information that is provided by the media server 160. It should be understood that the storage information may include various different parameters associated with various storage devices and delivery mechanisms. For example, the storage information may include storage availability at various storage devices located at a LAN or WAN, DVR bandwidth availability on a LAN or WAN, requested or potential media format conversions of the recording, a list of storage devices available for storing the requested recording (e.g., storage devices on corresponding LAN(s) and/or WAN(s)), and/or other information associated with recording and/or storing media at the corresponding WAN and/or LAN.

At 315, an algorithm may be run to select a storage device for storing the requested recording of the media. The algorithm may be run, for example, by a media server 160 of FIG. 1 or headend device or application (e.g., by a network determination module 225 of FIG. 2). The algorithm may guide a determination whether to store the recording at a WAN storage device such as the media server 160 (e.g., media storage 230 of FIG. 2) or at a LAN storage device such as a local storage device (e.g., a storage device within a subscriber premise such as the multimedia device 110, external storage 150, client device 120, etc.). If the determination is made to store the recording at a WAN storage device, a WAN storage device (e.g., media storage 230 of FIG. 2 or other storage device to which the recording may be delivered without using resources associated with a LAN) may be selected, and the recording may be stored at the selected WAN storage device. For example, the network determination module 225 may utilize storage information associated with the available WAN storage devices to select a WAN storage device for storing the recording. If the determination is made to store the recording at a LAN storage device, a LAN storage device (e.g., storage internal to a multimedia device 110 of FIG. 1, external storage connected to the multimedia device 110, client device associated with the multimedia device 110, etc.) may be selected, and the recording may be stored at the selected LAN storage device. For example, the multimedia device 110 (e.g., a device determination module 205 of FIG. 2) may utilize storage information associated with one or more available LAN storage devices to select a LAN storage device for storing the recording.

At 320, the recording of the media may be stored at the selected storage device.

Figure 4:
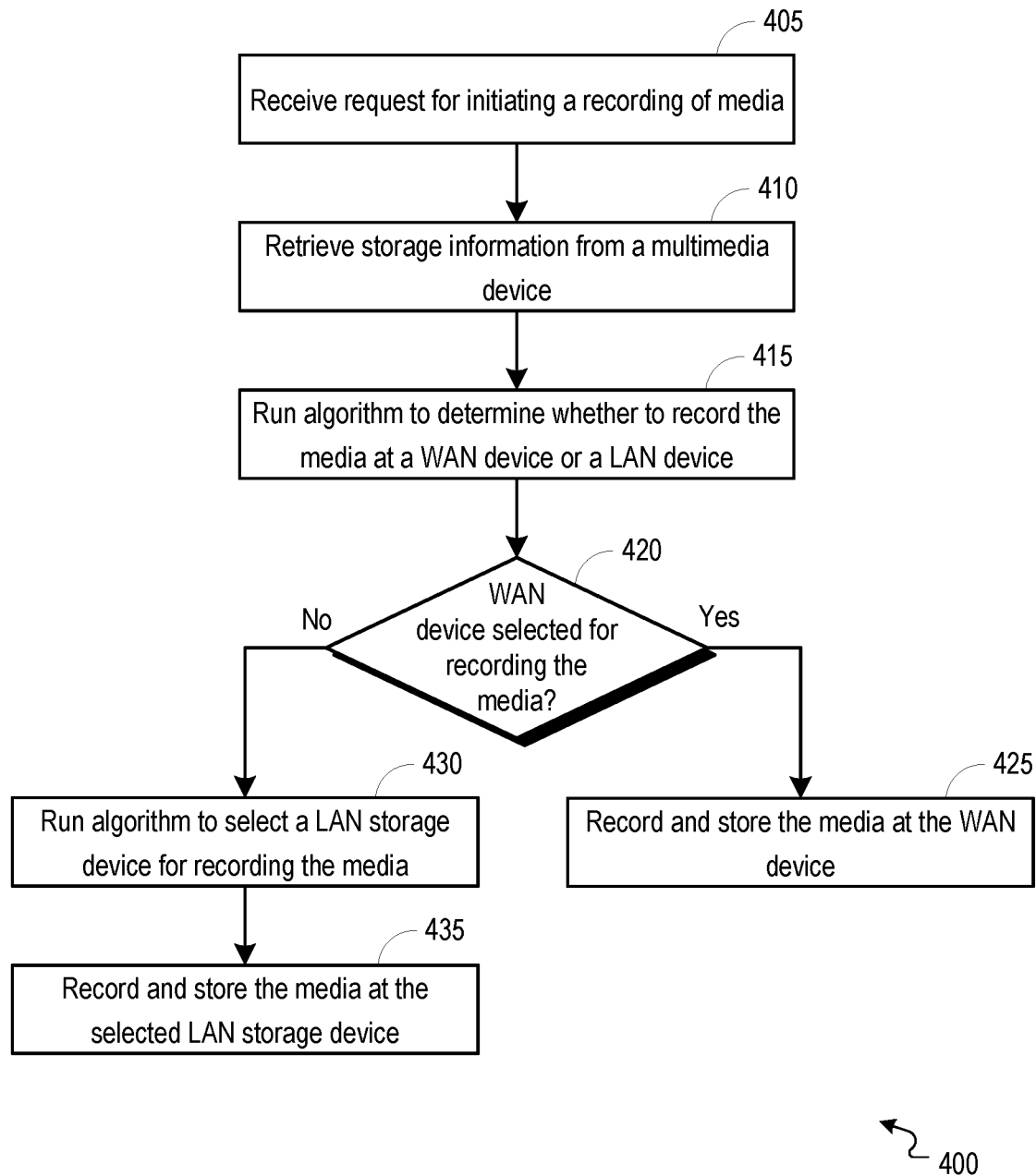
FIG. 4 is a flowchart illustrating an example process operable to facilitate a determination of a network and corresponding storage device for storing a recording of requested media.

FIG. 4 is a flowchart illustrating an example process 400 operable to facilitate a determination of a network and corresponding storage device for storing a recording of requested media. The process 400 can begin at 405, when a request for initiating a recording of media is received. The request for initiating the recording of the media may be received from a user at a multimedia device 110 of FIG. 1. The request may be received at the multimedia device 110 via a direct interaction between the user and the multimedia device 110, the request may be received at the multimedia device 110 from another device (e.g., client device 120 of FIG. 1), or the request may be received at the multimedia device 110 as a scheduled recording (e.g., recording scheduled by a user or scheduled based upon a content suggestion, user profile, series criteria, etc.). In embodiments, the request for initiating the recording of the media may be communicated from the multimedia device 110 to a media server (e.g., media server 160 of FIG. 1).

At 410, storage information may be retrieved from a multimedia device. Storage information may be retrieved, for example, by a media server 160 of FIG. 1 (e.g., by a network determination module 225 of FIG. 2). The storage information may be collected and maintained at a multimedia device 110 of FIG. 1 (e.g., by a storage status module 210 of FIG. 2). The storage information may include LAN-based input information that is provided from a multimedia device 110 and/or WAN-based input information that is provided by the media server 160. It should be understood that the storage information may include various different parameters associated with various storage devices and delivery mechanisms. For example, the storage information may include storage availability at various storage devices located at a LAN or WAN, DVR bandwidth availability on a LAN or WAN, requested or potential media format conversions of the recording, a list of storage devices available for storing the requested recording (e.g., storage devices on corresponding LAN(s) and/or WAN(s)), and/or other information associated with recording and/or storing media at the corresponding WAN and/or LAN.

At 415, an algorithm may be run to determine whether to record the requested media at a WAN storage device or a LAN storage device. The algorithm may be run, for example, by a media server 160 of FIG. 1 or headend device or application (e.g., by a network determination module 225 of FIG. 2). The algorithm may guide a determination whether to store the recording at a WAN storage device such as the media server 160 (e.g., media storage 230 of FIG. 2) or at a LAN storage device such as a local storage device (e.g., a storage device within a subscriber premise such as the multimedia device 110, external storage 150, client device 120, etc.). In embodiments, the algorithm may consider the amount of bandwidth available to deliver the content to a LAN device, the amount of storage available at one or more LAN devices, whether the content is to be transcoded before delivery to a requesting device, and other factors. For example, the algorithm may utilize the storage information retrieved at 410 to determine whether to record the media at a WAN storage device or a LAN storage device. It will be appreciated by those skilled in the relevant art that various parameters may be weighed in various proportions to make the determination of a storage device.

At 420, a determination may be made whether a WAN storage device is selected for recording the requested media. The determination whether a WAN storage device is selected for recording the requested media may be made, for example, by the network determination module 225 of FIG. 2. In embodiments, the determination whether a WAN storage device is selected for recording the requested media may be based upon an outcome of the algorithm that is run at 415.

If, at 420, the determination is made that a WAN storage device is selected for recording the requested media, the process 400 may proceed to 425. At 425, the requested media may be recorded and stored at the selected WAN storage device. The selected WAN storage device may be media storage 230 of FIG. 2 or one or more other storage devices to which the recording may be delivered without using resources associated with a LAN. In embodiments, the selected WAN storage device may be identified by the network determination module 225 of FIG. 2. For example, the network determination module 225 may utilize storage information associated with the available WAN storage devices to select a WAN storage device for storing the recording.

If, at 420, the determination is made that a WAN storage device is not selected for recording the requested media, the process 400 may proceed to 430. At 430, an algorithm may be run to select a LAN storage device for recording the requested media. The algorithm to select a LAN storage device for recording the requested media may be run, for example, by the network determination module 225 of FIG. 2 or by a multimedia device 110 of FIG. 1 (e.g., by a device determination module 205 of FIG. 2). LAN storage devices available for recording and/or storing the requested media may include storage internal to a multimedia device 110 of FIG. 1 (e.g., media storage 215 of FIG. 2), external storage (e.g., external storage 150 of FIG. 1) connected to the multimedia device 110, client devices (e.g., client devices 120 of FIG. 1) associated with the multimedia device 110, and/or other devices associated with a LAN. In embodiments, the device determination module 205 may utilize storage information associated with one or more available LAN storage devices to select a LAN storage device for storing the recording. In embodiments, the algorithm to select a LAN storage device may consider the amount of bandwidth available to deliver the content to a LAN device, the amount of storage available at one or more LAN devices, whether the content is to be transcoded before delivery to a requesting device, and other factors.

At 435, the requested media may be recorded and stored at the selected LAN storage device.

Figure 5:
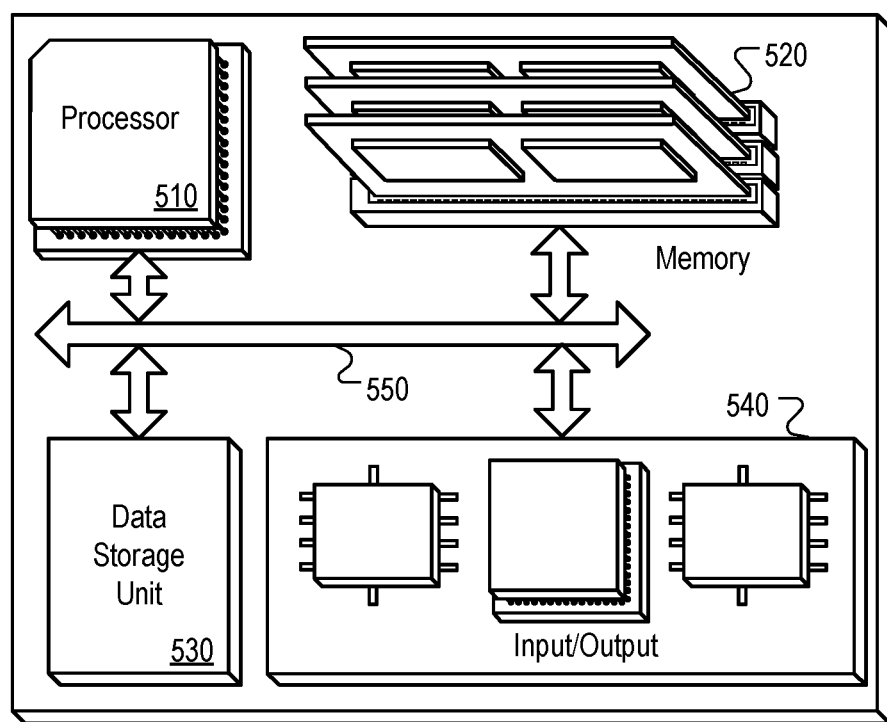
FIG. 5 is a block diagram of a hardware configuration operable to facilitate the dynamic selection of a storage device for storing media.

FIG. 5 is a block diagram of a hardware configuration 500 operable to facilitate the dynamic selection of a storage device for storing media. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530. It should be understood that the hardware configuration 500 may further include a transcoder configured to support format conversion of content.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a multimedia device 110 of FIG. 1 (e.g., access point, gateway device, STB, DVR or other content storage device, cable modem, router, wireless extender, or other access device) or client device 120 of FIG. 1 (e.g., STB, computer, television, tablet, mobile device, etc.). In another implementation, the input/output device can include driver devices configured to send communications to, and receive communications from one or more networks (e.g., WAN 130 of FIG. 1, local network, provider network 140 of FIG. 1, etc.).

Those skilled in the art will appreciate that the invention described herein improves upon methods and systems for selecting and distributing media amongst one or more storage devices. Methods, systems, and computer readable media may be operable to facilitate the dynamic selection of a storage device for storing media. When a recording request is received, storage information associated with resources of one or more networks and one or more storage devices may be retrieved, and a network may be selected for recording and storing the requested media based upon an algorithm that considers the retrieved information. One or more specific storage devices located on the selected network may be selected for recording and storing the requested media. The selection of the one or more specific storage devices may be made based upon an algorithm that considers the available resources and capabilities of available storage devices.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:

receiving a request to create a recording of a piece of content;

retrieving network information, the network information comprising bandwidth usage of a wide-area network, bandwidth usage of a local-area network, storage availability of one or more wide-area network storage devices, storage availability of one or more local-area network storage devices, and transcoding availability and location of one or more transcoding devices on the wide-area network, wherein the bandwidth usage of the wide-area network and the bandwidth usage of the local-area network comprise qualitative assessments that are determined based upon a measurement of transmission rates for the wide-area network and the local-area network and in association with each available storage device;

based upon the retrieved network information, selecting one of the wide-area network and the local area-network as a location at which to create a recording of the piece of content, selecting one of the wide-area network and the local area-network as a location at which to transcode the recording of the piece of content, and selecting one of the wide-area network and the local-area network as a location at which to store the recording of the piece of content;

the wide-area network is selected as the creating, the transcoding, and the storage location:
based upon the retrieved network information, selecting one or more wide-area network storage devices for creating the recording of the piece of content and storing the recording of the piece of content;
creating the recording of the piece of content at the one or more selected wide-area network storage devices;
transcoding the recording of the piece of content at the one or more selected wide-area network transcoding devices; and
storing the recording of the piece of content at the one or more selected wide-area network storage devices; and if the local-area network is selected as the creating, transcoding, and storage location:
based upon the retrieved storage information, selecting one or more local-area network storage devices for creating the recording of the piece of content and storing the recording of the piece of content;
creating the recording of the piece of content at the one or more selected local-area network storage devices;
storing the recording of the piece of content at the one or more selected local-area network storage devices; and
transcoding the recording of the piece of content when output to a client device.

2. The method of claim 1, wherein the network information further comprises transcoding capabilities of transcoding devices associated with one or more wide-area network storage devices and transcoding capabilities of transcoding devices associated with one or more local-area network storage devices.

3. The method of claim 1, wherein a plurality of local-area network storage devices are selected for storing the recording of the piece of content, and the recording of the piece of content is distributed amongst the plurality of local-area network storage devices such that a portion of the recording of the piece of content is stored at each local-area network storage device of the plurality of local-area network storage devices.

4. The method of claim 1, wherein the one or more local-area network storage devices are identified from a list comprising each of one or more local-area network storage devices that are associated with the local-area network.

5. The method of claim 4, wherein the one or more local-area network storage devices are identified and added to the list when the one or more local-area network storage devices are added to the local-area network.

6. The method of claim 4, wherein the one or more local-area network storage devices are removed from the list when the one or more local-area network storage devices are removed from the local-area network.

7. An apparatus comprising:
an interface configured to be used to receive a request to create a recording of a piece of content;
one or more modules configured to:
retrieve network information, the network information comprising bandwidth usage of a wide-area network, bandwidth usage of a local-area network, storage availability of one or more wide-area network storage devices, storage availability of one or more local-area network storage devices, and transcoding availability and location of one or more transcoding devices on the wide-area network;
based upon the retrieved network information, selecting one of the wide-area network and the local area-network as a location to create a recording of the piece of content, selecting one of the wide-area network and the local area-network as a location to transcode the recording of the piece of content, and selecting one of the wide-area network and the local-area network as a location to store the recording of the piece of content, wherein the bandwidth usage of the wide-area network and the bandwidth usage of the local-area network comprise qualitative assessments that are determined based upon a measurement of transmission rates for the wide-area network and the local-area network and in association with each available storage device;
if the wide-area network is selected as the location to create, transcode, and record the piece of content:
based upon the retrieved network information, select one or more wide-area network storage devices for creating the recording of the piece of content and storing the recording of the piece of content;
create the recording of the piece of content at the one or more selected wide-area network storage devices; and
output the recording of the piece of content for transcoding at the one or more transcoding devices and storing at the one or more selected wide-area network storage devices; and
if the local-area network is selected as the location to create, transcode, and record the piece of content:
based upon the retrieved network information, select one or more local-area network storage devices for creating the recording of the piece of content and storing the recording of the piece of content;
create the recording of the piece of content at the one or more selected local-area network storage devices; and
output the recording of the piece of content for storing at the one or more selected local-area network storage devices; and transcode the recording of the piece of content when output to a client device.

8. The apparatus of claim 7, wherein the network information further comprises transcoding capabilities transcoding devices associated with one or more wide-area network storage devices and transcoding capabilities of transcoding devices associated with one or more local-area network storage devices.

9. The apparatus of claim 7, wherein a plurality of local-area network storage devices are selected for storing the recording of the piece of content, and the recording of the piece of content is distributed amongst the plurality of local-area network storage devices such that a portion of the recording of the piece of content is stored at each local-area network storage device of the plurality of local-area network storage devices.

10. The apparatus of claim 7, wherein the one or more local-area network storage devices are identified from a list comprising each of one or more local-area network storage devices that are associated with the local-area network, and wherein the one or more local-area network storage devices are identified and added to the list when the one or more local-area network storage devices are added to the local-area network.

11. The apparatus of claim 10, wherein the one or more local-area network storage devices are removed from the list when the one or more local-area network storage devices are removed from the local-area network.

12. One or more non-transitory computer readable media having instructions operable to cause one or more processors to perform the operations comprising:
receiving a request to create a recording of a piece of content;
retrieving network information, the network information comprising bandwidth usage of a wide-area network, bandwidth usage of a local-area network, storage availability of one or more wide-area network storage devices, storage availability of one or more local-area network storage devices, and transcoding availability and location of one or more transcoding devices on the wide-area network, wherein the bandwidth usage of the wide-area network and the bandwidth usage of the local-area network comprise qualitative assessments that are determined based upon a measurement of transmission rates for the wide-area network and the local-area network and in association with each available storage device;
based upon the retrieved network information, selecting one of the wide-area network and the local area-network as a location at which to create a recording of the piece of content, selecting one of the wide-area network and the local area-network as a location at which to transcode the recording of the piece of content, and selecting one of the wide-area network and the local-area network as a location at which to store the recording of the piece of content;
if the wide-area network is selected as the location at which to create, transcode, and record the piece of content:
based upon the retrieved network information, selecting one or more wide-area network storage devices for creating the recording of the piece of content and storing the recording of the piece of content;
creating the recording of the piece of content at the one or more selected wide-area network storage devices;
transcoding the recording of the piece of content at the one or more selecting wide-area network transcoding devices; and
storing the recording of the piece of content at the one or more selected wide-area network storage devices; and
if the local-area network is selected as the location at which to create, transcode, and record the piece of content:
based upon the retrieved network information, selecting one or more local-area network storage devices for creating the recording of the piece of content and storing the recording of the piece of content;
creating the recording of the piece of content at the one or more selected local-area network storage devices;
storing the recording of the piece of content at the one or more selected local-area network storage devices;
transcoding the recording of the piece of content when output to a client device.

13. The one or more non-transitory computer-readable media of claim 12, wherein the network information further comprises transcoding capabilities of transcoding devices associated with one or more wide-area network storage devices and transcoding capabilities of transcoding devices associated with one or more local-area network storage devices.

14. The one or more non-transitory computer-readable media of claim 12, wherein a plurality of local-area network storage devices are selected for storing the recording of the piece of content, and the recording of the piece of content is distributed amongst the plurality of local-area network storage devices such that a portion of the recording of the piece of content is stored at each local-area network storage device of the plurality of local-area network storage devices.

15. The one or more non-transitory computer-readable media of claim 12, wherein the one or more local-area network storage devices are identified from a list comprising each of one or more local-area network storage devices that are associated with the local-area network.

16. The one or more non-transitory computer-readable media of claim 15, wherein the one or more local-area network storage devices are identified and added to the list when the one or more local-area network storage devices are added to the local-area network.

17. The one or more non-transitory computer-readable media of claim 15, wherein the one or more local-area network storage devices are removed from the list when the one or more local-area network storage devices are removed from the local-area network.

* * * * *